US011297545B2

(12) United States Patent
Liu et al.

(10) Patent No.: US 11,297,545 B2
(45) Date of Patent: Apr. 5, 2022

(54) SWITCHING METHOD AND ACCESS NETWORK DEVICE (71) Applicant: GUANGDONG OPPO MOBILE TELECOMMUNICATIONS CORP., LTD., Guangdong (CN)

(72) Inventors: Jianhua Liu, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

(21) Appl. No.: 17/043,626

(22) PCT Filed: Mar. 30, 2018

(86) PCT No.: PCT/CN2018/081467
§ 371 (c)(1),
(2) Date: Sep. 29, 2020

(87) PCT Pub. No.: WO2019/183971
PCT Pub. Date: Oct. 3, 2019

(65) Prior Publication Data
US 2021/0022050 A1 Jan. 21, 2021

(51) Int. Cl.
*H04W 76/12* (2018.01)
*H04W 36/00* (2009.01)
(Continued)

(52) U.S. Cl.
CPC ......... *H04W 36/0022* (2013.01); *H04W 8/26* (2013.01); *H04W 36/0055* (2013.01);
(Continued)

(58) Field of Classification Search
CPC . H04W 36/0022; H04W 76/12; H04W 76/11; H04W 8/26; H04W 36/0055;
(Continued)

(56) References Cited

U.S. PATENT DOCUMENTS

2015/0127733 A1* 5/2015 Ding .................. H04W 8/005
709/204
2021/0294877 A1* 9/2021 Konrardy ............. G07C 5/0841
(Continued)

FOREIGN PATENT DOCUMENTS

CN 101272604 9/2008
CN 101557609 10/2009
(Continued)

OTHER PUBLICATIONS

Ericsson, "Lossless intra-system handover with 5G-CN," 3GPP TSG-RAN WG2 #98-AH, Tdoc R2-1707231 (Revision of R2-1705431), Jun. 2017, 4 pages.
(Continued)

*Primary Examiner* — Julio R Perez
(74) *Attorney, Agent, or Firm* — Hodgson Russ LLP (57) ABSTRACT

Embodiments of the present application disclose a switching method and an access network device. The switching method comprises: on a terminal device switching from a first control plane core network device to a second control plane core network device, a first access network device sending a tunnel setup request message to a second access network device; the first access network device receiving information of a data tunnel established by the second access network device according to the tunnel setup request message; and the first access network device sending information of the data tunnel to the terminal device, wherein the information of the data tunnel is used for data transmission between the terminal device and a user plane core network device. The embodiments of the present application can improve reliability of data transmission.

14 Claims, 5 Drawing Sheets

(51) Int. Cl.
*H04W 76/11* (2018.01)
*H04W 8/26* (2009.01)
*H04W 36/14* (2009.01)
*H04W 88/06* (2009.01)

(52) U.S. Cl.
CPC ............ *H04W 36/14* (2013.01); *H04W 76/11* (2018.02); *H04W 76/12* (2018.02); *H04W 88/06* (2013.01)

(58) Field of Classification Search
CPC . H04W 36/14; H04W 88/06; H04W 36/0016; H04W 36/0066; H04W 36/0011; H04W 36/02; H04W 36/385; H04W 36/08
See application file for complete search history.

(56) References Cited

U.S. PATENT DOCUMENTS

| | | | | |
|---|---|---|---|---|
| 2021/0297406 | A1* | 9/2021 | Landers | ............... H04L 63/0807 |
| 2021/0297922 | A1* | 9/2021 | Bhatti | ............... H04W 36/0011 |
| 2021/0298120 | A1* | 9/2021 | Sharma | ............... H04W 12/033 |

FOREIGN PATENT DOCUMENTS

| | | |
|---|---|---|
| CN | 101765218 | 6/2010 |
| CN | 101938802 | 1/2011 |
| CN | 104969653 | 10/2015 |
| EP | 2296403 | 3/2011 |
| KR | 20160121776 | 10/2016 |

OTHER PUBLICATIONS

Samsung, "Support of Inter-system Inter-RAT handover between NR and E-UTRA," 3GPP TSG-RAN WG3 NR AdHoc, R3-172220, Jun. 2017, 5 pages.

Huawei, "Inter-system mobility cases," 3GPP TSG-RAN WG3 AH, R3-170229, Jan. 2017, 5 pages.

Oppo, "Discussion on Inter-RAT Handover between NR and LTE," 3GPP TSG-RAN WG2#101, R2-1801787, Revision of R2-1800065, Feb. 2018, 7 pages.

EPO, Extended European Search Report for EP Application No. 18911753.4, dated Mar. 4, 2021.

WIPO, ISR for PCT/CN2018/081467, dated Jan. 2, 2019.

\* cited by examiner

SWITCHING METHOD AND ACCESS NETWORK DEVICE

CROSS-REFERENCE TO RELATED APPLICATION

This application is a U.S. national stage entry of International Application No. PCT/CN2018/081467, filed on Mar. 30, 2018, which is hereby incorporated by reference in its entirety.

TECHNICAL FIELD

The present disclosure relates to a field of communication technology, and in particular, to a switching method and an access network device.

BACKGROUND

In a New Radio (NR) system, an NR base station and a Long Term Evolution (LTE) base station access an Evolved Packet Core (EPC) or 5th Generation Wireless System (5G) core network separately or simultaneously. For a cross-core network scenario, in an existing switching process, there may be data to be transmitted during a process of switching.

SUMMARY

In view of this, a switching method and an access network device are provided according to embodiments of the present application. During a process of switching, data may be forwarded through a data tunnel established by a target access network device, so that reliability of data transmission may be improved as much as possible.

In a first aspect, a switching method is provided according to an embodiment of the present application, which includes: sending, by a first access network device, a tunnel setup request message to a second access network device, in response to switching of a terminal device from a first control plane core network device to a second control plane core network device; receiving, by the first access network device, information of a data tunnel established by the second access network device according to the tunnel setup request message; and sending, by the first access network device, the information of the data tunnel to the terminal device, wherein the information of the data tunnel is used for data transmission between the terminal device and a user plane core network device.

In a possible implementation, the data tunnel includes a tunnel between the first access network device and the second access network device, the tunnel setup request message carries an identification of the first access network device, and the information of the data tunnel includes an identification of the data tunnel and/or one or more configuration parameters of the data tunnel.

In a possible implementation, the identification of the data tunnel includes an identification of the second access network device.

In a possible implementation, the method further includes: receiving, by the first access network device, uplink data sent by the terminal device, from the second access network device through the data tunnel; and sending, by the first access network device, the uplink data to the user plane core network device.

In a possible implementation, the method further includes: receiving, by the first access network device, downlink data sent by the user plane core network device; and sending, by the first access network device, the downlink data to the second access network device through the data tunnel, wherein the downlink data is sent by the second access network device to the terminal device.

In a second aspect, an access network device is provided according to an embodiment of the application, which is a first access network device, the access network device including a transceiver, wherein the transceiver is configured to send a tunnel setup request message to a second access network device, in response to switching of a terminal device from a first control plane core network device to a second control plane core network device; the transceiver is further configured to receive information of a data tunnel established by the second access network device according to the tunnel setup request message; and the transceiver is further configured to send the information of the data tunnel to the terminal device, wherein the information of the data tunnel is used for data transmission between the terminal device and a user plane core network device.

In a possible implementation, the data tunnel is a tunnel between the second access network device and the user plane core network device, the tunnel setup request message carries an identification of the user plane core network device, and the information of the data tunnel includes an identification of the data tunnel, or one or more configuration parameters of the data tunnel, or the identification of the data tunnel and the one or more configuration parameters of the data tunnel.

In a possible implementation, the identification of the user plane core network device, or the identification of the data tunnel, or the identification of the user plane core network device and the identification of the data tunnel being used to send uplink data of the terminal device to the user plane core network device.

In a possible implementation, before the terminal device completes the switching, the terminal device accesses the first control plane core network device through the first access network device; and after the terminal device completes the switching, the terminal device accesses the second control plane core network device through the second access network device.

In a possible implementation, the first control plane core network device and the second control plane core network device are core network devices in different communication systems or different core network devices in a same communication system.

In a third aspect, an access network device is provided according to an embodiment of the application, which is a second access network device, the access network device including a transceiver and a processor, wherein the transceiver is configured to receive a tunnel setup request message sent by a first access network device, in response to switching of a terminal device from a first control plane core network device to a second control plane core network device; the processor is configured to establish a data tunnel according to the tunnel setup request message, wherein the data tunnel is used for data transmission between the terminal device and a user plane core network device; and the transceiver is further configured to send information of the data tunnel to the first access network device.

In a possible implementation, the data tunnel is a tunnel between the first access network device and the second access network device, the tunnel setup request message carries an identification of the first access network device, and the information of the data tunnel includes an identification of the data tunnel, or one or more configuration parameters of the data tunnel, or the identification of the data tunnel and the one or more configuration parameters of the data tunnel.

In a possible implementation, the identification of the data tunnel is an identification of the second access network device.

In a possible implementation, the transceiver is further configured to receive uplink data sent by the terminal device; and the transceiver is further configured to forward the uplink data to the first access network device through the data tunnel.

In a possible implementation, the processor is further configured to release the data tunnel, after the second access network device receives a switching completion message sent by the terminal device; or the transceiver is further configured to send a path switching message to the second control plane core network device; or the processor is further configured to release the data tunnel, after the second access network device receives a switching completion message sent by the terminal device, and the transceiver is further configured to send a path switching message to the second control plane core network device.

In a possible implementation, the data tunnel includes a tunnel between the second access network device and the user plane core network device, the tunnel setup request message carries an identification of the user plane core network device, and the information of the data tunnel includes an identification of the data tunnel, or one or more configuration parameters of the data tunnel, or the identification of the data tunnel and the one or more configuration parameters of the data tunnel.

In a possible implementation, the transceiver is further configured to send a path switching message to the second control plane core network device, wherein the path switching message carries the identification of the data tunnel, and the identification of the data tunnel is used to send downlink data by the user plane core network device to the terminal device through the data tunnel.

In a possible implementation, the transceiver is further configured to receive uplink data sent by the terminal device; and the transceiver is further configured to send the uplink data to the user plane core network device through the data tunnel.

In a possible implementation, the transceiver is further configured to receive downlink data sent by the user plane core network device through the data tunnel; and the transceiver is further configured to send the downlink data to the terminal device.

In a possible implementation, an identification of the data tunnel, or one or more configuration parameters of the data tunnel, or the identification of the data tunnel and the one or more configuration parameters of the data tunnel being assigned by the second access network device.

These or other aspects of the present application will be more concise and understandable in the description of the following embodiments.

DETAILED DESCRIPTION

The technical solutions in the embodiments of the present application will be described clearly and completely with reference to the drawings in the embodiments of the present application.

It should be understood that the technical solutions of the embodiments in the present application may be applied to various communication systems, such as: Global System of Mobile Communication (GSM) system, Code Division Multiple Access (CDMA) system, Wideband Code Division Multiple Access (WCDMA) system, General Packet Radio Service (GPRS), Long Term Evolved (LTE) system, LTE Frequency Division Duplex (FDD) System, LTE Time Division Duplex (TDD), Universal Mobile Telecommunication System (UMTS), Worldwide Interoperability for Microwave Access (WiMAX) communication system, New Radio (NR) and/or future 5G systems, and the like.

In particular, the technical solutions of the embodiments of the present application may be applied to various communication systems based on non-orthogonal multiple access technology, such as Sparse Code Multiple Access (SCMA) system and/or Low Density Signature (LDS) system, etc. Of course, SCMA system and LDS system may also be called as other names in the communication field. Furthermore, the technical solutions of the embodiments of the present application may be applied to multi-carrier transmission systems using the non-orthogonal multiple access technology, such as Orthogonal Frequency Division Multiplexing (OFDM), Filter Bank Multi-Carrier (FBMC), Generalized Frequency Division Multiplexing (GFDM), and/or Filtered-OFDM (F-OFDM) system, etc. using the non-orthogonal multiple access technology.

A terminal device in the embodiments of the present application may refer to a User Equipment (UE), an access terminal, a user unit, a user station, a mobile station, a mobile radio station, a remote station, a remote terminal, a mobile device, a user terminal, a terminal, a wireless communication device, a user agent and/or a user apparatus. The access terminal may be a cellular phone, a cordless phone, a Session Initiation Protocol (SIP) phone, a Wireless Local Loop (WLL) station, a Personal Digital Assistant (PDA), a handheld device with a wireless communication function, a computing device or other types of processing devices connected to a wireless modem, an in-vehicle device, a wearable device, a terminal device in a future 5G network, and/or a terminal device in a public land mobile network (PLMN) evolved in the future, and the like, which is not limited in the embodiments of the present application.

An access network device in the embodiments of the present application may be a device for communicating with a terminal device. The access network device may be a Base Transceiver Station (BTS) in GSM or CDMA, a NodeB (NB) in a WCDMA system, an Evolutional NodeB (eNB or eNodeB) in an LTE system, or a wireless controller in a Cloud Radio Access Network (CRAN) scenario. Or the access network device may also be a relay station, an access point, an in-vehicle device, a wearable device, and/or an access network device in a future 5G network, etc., which is not limited in the embodiments of the present application.

It should be understood that a core network device in the embodiments of the present application may be a core network device in the foregoing various communication systems. For example, it may be an Evolved Packet Core of the LTE system, and/or a next generation core (NGC) in NR, which is not limited in the embodiments of the present application.

Figure 1:
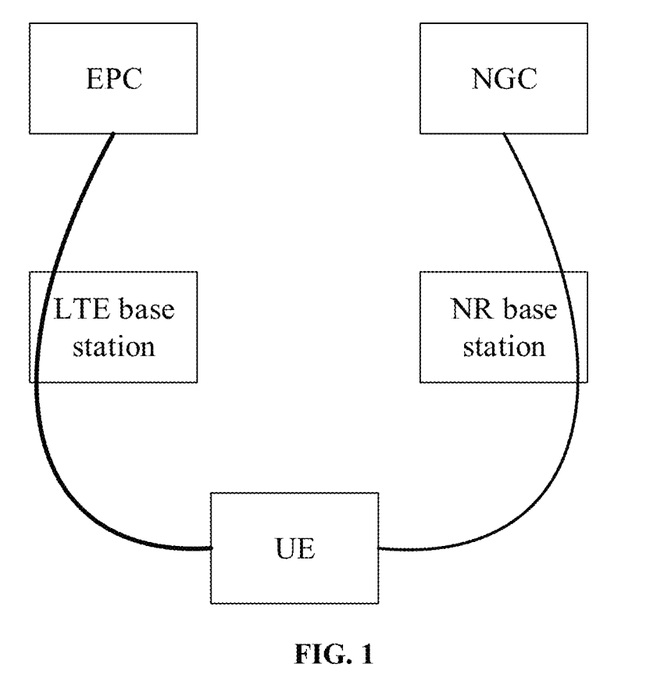
FIG. 1 shows a schematic diagram of an application scenario according to an embodiment of the present application.

An application scenario of the embodiments of the present application will be described below with reference to FIG. 1 first. As shown in FIG. 1, a UE may access a core network EPC in LTE through a base station in LTE, or access a core network NGC in NR through a base station in NR. It should be understood that crossing core networks in the embodiments of the present application may be crossing systems, for example, switching from the core network NGC in NR to the core network EPC in LTE. The crossing core networks in the embodiments of the present application may also refer to different core network devices in the same communication system. For example, both core network devices before and after switching may be core network devices in LTE, or both may be core network devices in NR.

In an existing cross-core network solution, a source access network may determine timing of triggering the switching according to a measurement threshold. In other words, the source access network device determines whether it is to switch across core networks. If yes, a switching request needs to be sent to the source core network device, and the source core network device may notify a target core network device to prepare resources, thereby triggering a terminal device to perform the switching. In the existing cross-core network switching process, there are too many switching steps. In a case where the terminal device moves too fast and data needs to be transmitted during this period, transmission of the data will not be guaranteed if the switching is not timely, that is to say, untimely switching may cause failure of data transmission.

Figure 2:
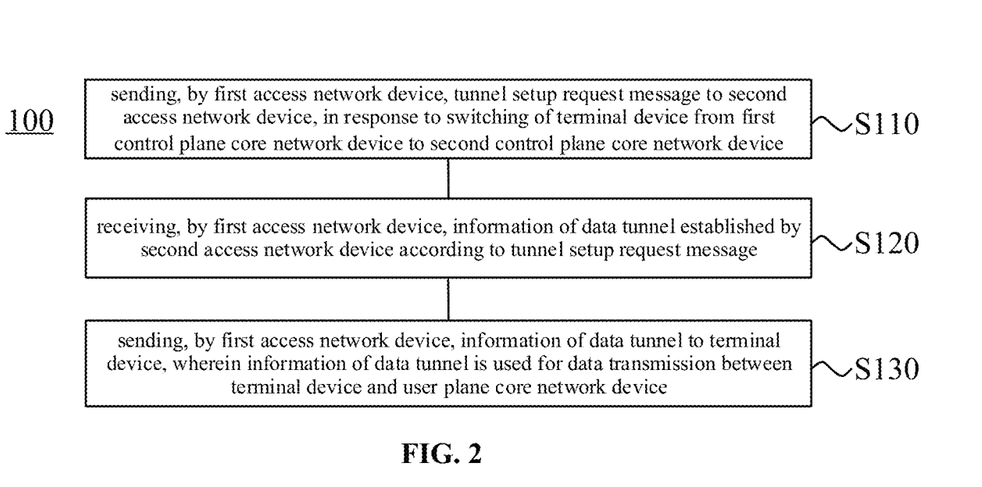
FIG. 2 shows a schematic block diagram of a switching method according to an embodiment of the present application.

FIG. 2 shows a schematic block diagram of a switching method 100 according to an embodiment of the present application. As shown in FIG. 2, the method 100 may be applied to the application scenario in FIG. 1. The method 100 includes some or all of the following:

S110, sending, by a first access network device, a tunnel setup request message to a second access network device, in response to switching of a terminal device from a first control plane core network device to a second control plane core network device;

S120, receiving, by the first access network device, information of a data tunnel established by the second access network device according to the tunnel setup request message; and S130, sending, by the first access network device, the information of the data tunnel to the terminal device, wherein the information of the data tunnel is used for data transmission between the terminal device and a user plane core network device.

It should be noted that the first access network device in the embodiments of the present application may be referred to as a source access network device, and the second access network device may be referred to as a target access network device. Also, the first control plane core network device may be referred to as a source control plane core network device, and the second control plane core network device may be referred to as a target control plane core network device. That is, before the terminal device completes the switching, the terminal device accesses the first control plane core network device through the first access network device; and after the terminal device completes the switching, the terminal device accesses the second control plane core network device through the second access network device. The user plane core network device corresponding to different control plane core network devices in the embodiments of the present application may be considered to be the same.

Specifically, before the switching, the terminal device may access the source control plane core network device and the user plane core network device through the source access network device, respectively. The terminal device sends a measurement report to the source access network device. The source access network device may determine whether it is necessary to switch the control plane core network device based on the measurement report reported by the terminal device. In a case that the source access network device determines that the switching is between the core networks, such as, between systems, or between different core network devices in the same system, the source access network device may send a tunnel setup request message to the target access network device, and the target access network device may establish a data tunnel between the source access network device and the target access network device according to the tunnel setup request message, and then data between the terminal device and the user plane core network device may be forwarded through the data tunnel. Or, the target access network device may also directly establish a data tunnel between the target access network device and the user plane core network device according to the tunnel setup request message, that is, the data between the terminal device and the user plane core network device may directly forwarded by the data tunnel.

Therefore, in the switching method of the embodiment of the present application, data may be forwarded through the data tunnel established by the target access network device during a process of switching, so that reliability of data transmission may be improved as much as possible.

Optionally, in the embodiment of the present application, the data tunnel may be a tunnel between the first access network device and the second access network device, and the tunnel setup request message carries an identification of the first access network device, and the information of the data tunnel includes an identification of the data tunnel and/or one or more configuration parameters of the data tunnel.

Figure 3:
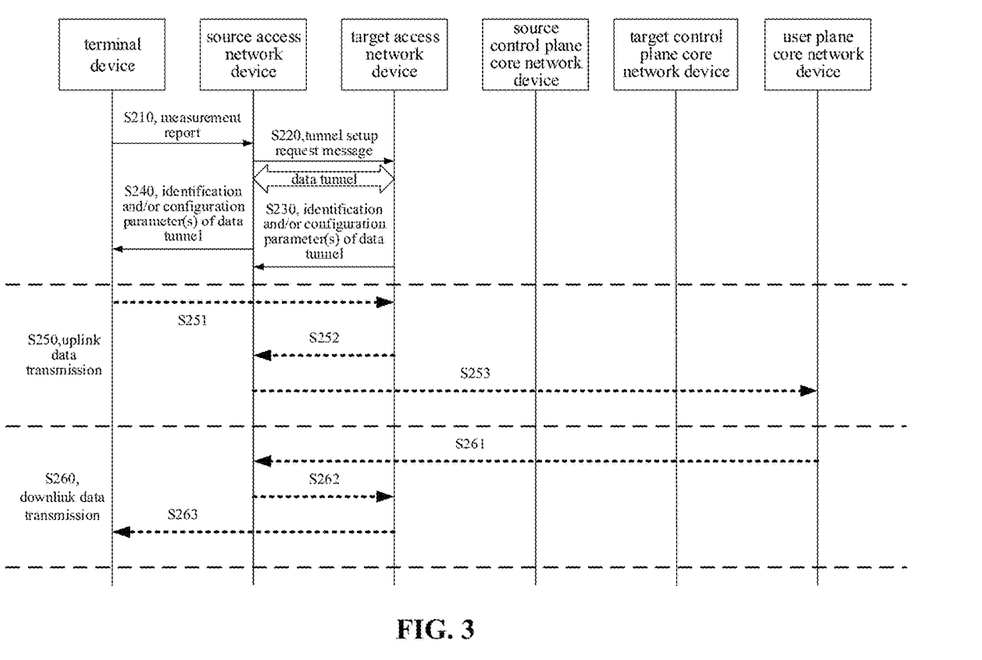
FIG. 3 shows another schematic block diagram of a switching method according to an embodiment of the present application.

FIG. 3 is a schematic flowchart of a switching method 200 according to an embodiment of the present application. As shown in FIG. 3, the method 200 includes some or all of S210 to S240.

In S210, a terminal device sends a measurement report to a source access network device, and the source access network device determines whether it is to cross core networks according to the measurement report.

In S220, in a case that the source access network device determines that it is to cross the core networks, the source access network device sends a tunnel setup request message to a target access network device. The tunnel setup request message may carry an identification of the source access network device. For example, the identification of the source access network device may be a Tunnel Endpoint Identification (TEID). After receiving the tunnel setup request message, the target access network device may establish a data tunnel between the source access network device and the target access network device. The target access network device may assign a resource or an identification to the data tunnel, for example, an address may be assigned to the data tunnel.

In S230, the target access network device feeds back some information configured for the data tunnel to the source access network device. For example, the target access network device may send the identification of the data tunnel and/or one or more configuration parameters of the data tunnel to the source access network device. Further, the identification of the data tunnel may be an identification of the target access network device. In this case, the source access network device may know that the target access network device establishes a data tunnel between the source access network device and the target access network device.

In S240, after receiving the identification of the data tunnel and/or the one or more configuration parameters of the data tunnel sent by the target access network, the source access network device forwards the identification of the data tunnel and/or the one or more configuration parameters of the data tunnel to the terminal device. Therefore, the terminal device may send or receive data according to the information of the data tunnel.

Optionally, the method 200 may further include S250, i.e., the terminal device may send uplink data to the user plane core network device. Further, the S250 may include S251 to S253.

In S251, the terminal device may send the uplink data to the target access network device, when the terminal device has switched from the source access network device to the target access network device.

In S252, the target access network device may forward the uplink data to the source access network device through the data tunnel established between the source access network device and the target access network device.

In S253, the source access network device may further forward the uplink data to the user plane core network device.

Optionally, the method 200 may further include S260, i.e., the user plane core network device may send downlink data to the terminal device. Further, the S260 may include S261 to S263.

In S261, the user plane core network device may send the downlink data to the source access network device, when the terminal device has switched from the source access network device to the target access network device.

In S262, the source access network device may forward the downlink data to the target access network device through the data tunnel established between the source access network device and the target access network device.

In S263, the target access network device further forwarding the downlink data to the terminal device.

Optionally, the method 200 may further include:
in the case where the source access network device determines that it is to switch across core networks, the source access network device may also send a switching request to the source control plane core network device, so that the source control plane core network device may also obtain a session context for a packet data unit (PDU) from the user plane core network device. The source access network device may also initiate a switching command to the terminal device, and after receiving the switching command, the terminal device may send a switching completion message to the target access network device.

Optionally, after receiving the switching completion message sent by the terminal device, the target access network device may send a switching completion notification to the target control plane core network device, then the target control plane core network device may send a path switching message to the user plane core network device, and the user plane core network device may switch a path between the user plane core network device and the control plane core network device from the source control plane core network device to the target control plane core network device.

Optionally, after receiving the switching completion message sent by the terminal device, the target access network device may also release the data tunnel established between the target access network device and the source access network device.

Optionally, in the embodiment of the present application, the data tunnel may be a tunnel between the second access network device and the user plane core network device, the tunnel setup request message carries an identification of the user plane core network device, and the identification of the user plane core network device is used to send the uplink data sent by the terminal device to the user plane core network device through the data tunnel by the second access network device.

Figure 4:
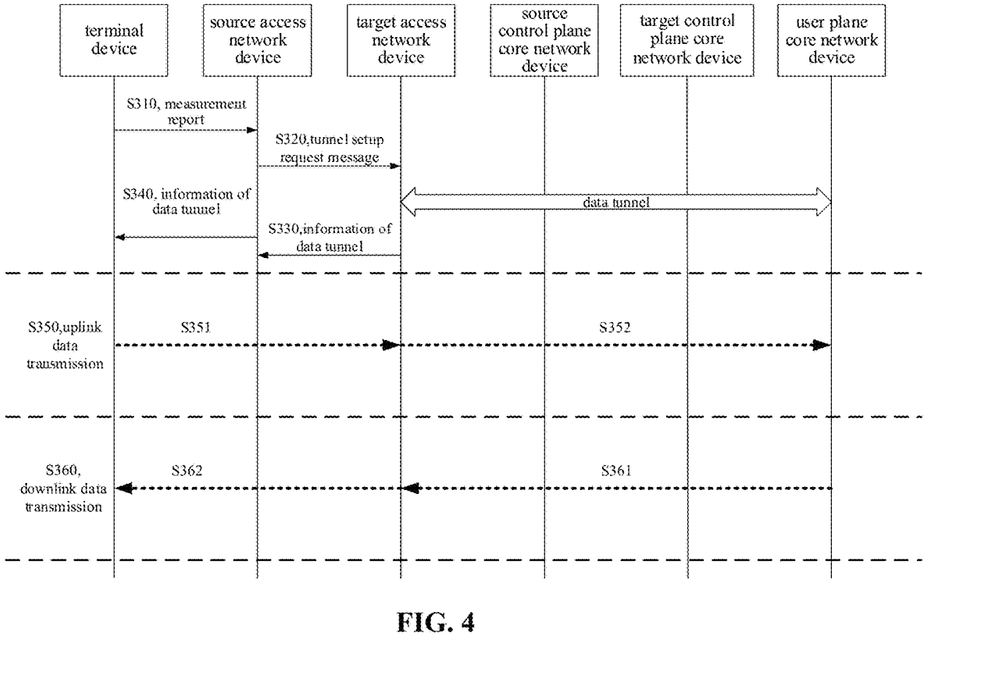
FIG. 4 shows another schematic block diagram of a switching method according to an embodiment of the present application.

FIG. 4 is a schematic flowchart of a switching method 300 according to an embodiment of the present application. As shown in FIG. 4, the method 300 includes some or all of S310 to S340.

In S310, a terminal device sends a measurement report to a source access network device, and the source access network device may determine whether it is to cross core networks according to the measurement report.

In S320, in a case that the source access network device determines that it is to cross core networks, the source access network device sends a tunnel setup request message to a target access network device. The tunnel setup request message may carry an identification of a user plane core network device. For example, the identification of the user plane core network device may be address information of the user plane core network device. After receiving the tunnel setup request message, the target access network device may directly establish a data tunnel between the target access network device and the user plane core network device. The target access network device may assign a resource or an identification to the data tunnel, for example, an address may be assigned to the data tunnel.

In S330, the target access network device may feed back some information configured for the data tunnel to the source access network device. The information of the data tunnel may include the identification of the data tunnel and/or one or more configuration parameters of the data tunnel.

In S340, after receiving the information of the data tunnel sent by the target access network, the source access network device may forward the information of the data tunnel to the terminal device. Therefore, the terminal device may send or receive data according to the information of the data tunnel.

Optionally, the method 300 may further include S350, i.e., the terminal device may send uplink data to the user plane core network device. Further, the S350 may include S351 to S352.

In S351, the terminal device may send the uplink data to the target access network device, when the terminal device has switched from the source access network device to the target access network device.

In S352, the target access network device may directly forward the uplink data to the user plane core network device through the data tunnel established between the source access network device and the user plane core network device. Specifically, the target access network device has obtained the identification of the user plane core network device from the tunnel setup request message sent by the source access network device, so that the target access network device may send the uplink data to the user plane core network device according to the identification of the user plane core network device.

Optionally, the method 300 may further include S360, i.e., the user plane core network device may send downlink data to the terminal device. Further, the S360 may include S361 to S362.

In S361, the user plane core network device may send the downlink data to the target access network device through the data tunnel established between the user plane core network device and the target access network device, when the terminal device has switched from the source access network device to the target access network device.

In S362, the target access network device may further forward the downlink data to the terminal device.

Optionally, the method 300 may further include:

after establishing a data tunnel between the target access network device and the user plane core network device, the target access network device may send a path switching message to the target control plane core network device, so that the target control plane core network device may notify the user plane core network device to switch a path between the control plane core network device and the user plane core network device from the source control plane core network device to the target control plane core network device. Further, the path switching message may further include the identification of the data tunnel, so that the target control plane core network device may instruct the user plane core network device to send the downlink data to the terminal device through the data tunnel.

It should also be understood that in various embodiments of the present application, the sequence numbers of the above processes do not mean an execution order thereof, which should be determined by functions and inherent logics thereof, and should not make any restriction to the implementation processes of the embodiments in the present application.

Figure 5:
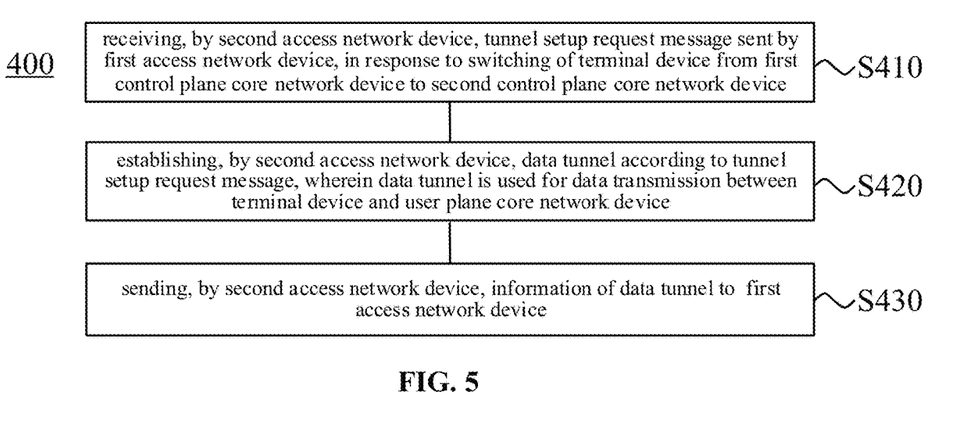
FIG. 5 shows another schematic block diagram of a switching method according to an embodiment of the present application.

FIG. 5 shows a schematic block diagram of a switching method 400 according to an embodiment of the present application. As shown in FIG. 5, the method 400 may be applied to the application scenario in FIG. 1. The method 400 includes some or all of the following:

S410, receiving, by a second access network device, a tunnel setup request message sent by a first access network device, in response to switching of a terminal device from a first control plane core network device to a second control plane core network device;

S420, establishing, by the second access network device, a data tunnel according to the tunnel setup request message, wherein the data tunnel is used for data transmission between the terminal device and a user plane core network device; and S430, sending, by the second access network device, information of the data tunnel to the first access network device.

Therefore, in the switching method according to the embodiment of the present application, data may be forwarded through a data tunnel established by a target access network device during a process of switching, so that reliability of data transmission may be improved as much as possible.

Optionally, in the embodiment of the present application, the data tunnel may be a tunnel between the first access network device and the second access network device, the tunnel setup request message carries an identification of the first access network device, and the information of the data tunnel includes an identification of the data tunnel and/or one or more configuration parameters of the data tunnel.

Optionally, in the embodiment of the present application, the identification of the data tunnel may be an identification of the second access network device.

Optionally, in the embodiment of the present application, the method further includes: receiving, by the second access network device, uplink data sent by the terminal device; and forwarding, by the second access network device, the uplink data to the first access network device through the data tunnel.

Optionally, in the embodiment of the present application, the method further includes: receiving, by the second access network device, downlink data sent by the user plane core network device, from the first access network device through the data tunnel; and forwarding, by the second access network device, the downlink data to the terminal device.

Optionally, in an embodiment of the present application, the method further includes:

after the second access network device receives a switching completion message sent by the terminal device, releasing, by the second access network device, the data tunnel, and/or sending, by the second access network device, a path switching message to the second control plane core network device.

Optionally, in the embodiment of the present application, the data tunnel may be a tunnel between the second access network device and the user plane core network device, the tunnel setup request message carries an identification of the user plane core network device, and the information of the data tunnel includes the identification of the data tunnel and/or the one or more configuration parameters of the data tunnel.

Optionally, in the embodiment of the present application, the identification of the user plane core network device and/or the identification of the data tunnel being used to send the uplink data of the terminal device to the user plane core network device.

Optionally, in the embodiment of the present application, the method further includes: sending, by the second access network device, a path switching message to the second control plane core network device, wherein the path switching message carries the identification of the data tunnel, and the identification of the data tunnel is used to send the downlink data by the user plane core network device to the terminal device through the data tunnel.

Optionally, in the embodiment of the present application, before the terminal device completes the switching, the terminal device accesses the first control plane core network device through the first access network device; and after the terminal device completes the switching, the terminal device accesses the second control plane core network device through the second access network device.

Optionally, in the embodiment of the present application, the first control plane core network device and the second control plane core network device may be core network devices in different communication systems or different core network devices in the same communication system.

It should be understood that the second access network device interacts with the first access network device, and related characteristics and functions of the second access network device correspond to related characteristics and functions of the first access network device. That is, a message is sent by the first access network device to the second access network device, and a corresponding message is received by the second access network device from the first access network device.

The switching method according to the embodiment of the present application is described in detail above. A switching device according to embodiments of the present application will be described below with reference to FIGS. 6 to 9. The technical features described in the method embodiments are applicable to the following device embodiments.

Figure 6:
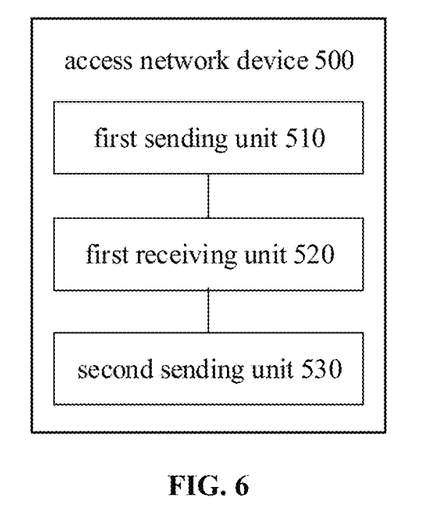
FIG. 6 shows a schematic block diagram of an access network device according to an embodiment of the present application.

FIG. 6 shows a schematic block diagram of an access network device 500 according to an embodiment of the present application. As shown in FIG. 6, the access network device may be a first access network device, and the access network device 500 includes:

a first sending unit 510, configured to send, by the first access network device, a tunnel setup request message to a second access network device, in response to switching of a terminal device from a first control plane core network device to a second control plane core network device;

a first receiving unit 520, configured to receive information of a data tunnel established by the second access network device according to the tunnel setup request message; and a second sending unit 530, configured to send the information of the data tunnel to the terminal device, wherein the information of the data tunnel is used for data transmission between the terminal device and a user plane core network device.

Therefore, in the access network device according to the embodiment of the present application, data may be forwarded through a data tunnel established by a target access network device during a process of switching, so that reliability of data transmission may be improved as much as possible.

Optionally, in the embodiment of the present application, the data tunnel may be a tunnel between the first access network device and the second access network device, the tunnel setup request message carries an identification of the first access network device, and the information of the data tunnel includes an identification of the data tunnel and/or one or more configuration parameters of the data tunnel.

Optionally, in the embodiment of the present application, the identification of the data tunnel may be an identification of the second access network device.

Optionally, in the embodiment of the present application, the access network device further includes: a second receiving unit, configured to receive uplink data sent by the terminal device, from the second access network device through the data tunnel; and a third sending unit, configured to forward the uplink data to the user plane core network device.

Optionally, in the embodiment of the present application, the access network device further includes: a third receiving unit, configured to receive downlink data sent by the user plane core network device; and a fourth sending unit, configured to forward the downlink data to the second access network device through the data tunnel.

Optionally, in the embodiment of the present application, the data tunnel may be a tunnel between the second access network device and the user plane core network device, the tunnel setup request message carries an identification of the user plane core network device, and the information of the data tunnel includes the identification of the data tunnel and/or the one or more configuration parameters of the data tunnel.

Optionally, in the embodiment of the present application, the identification of the user plane core network device and/or the identification of the data tunnel being used to send the uplink data of the terminal device to the user plane core network device.

Optionally, in the embodiment of the present application, before the terminal device completes the switching, the terminal device accesses the first control plane core network device through the first access network device; and after the terminal device completes the switching, the terminal device accesses the second control plane core network device through the second access network device.

Optionally, in the embodiment of the present application, the first control plane core network device and the second control plane core network device may be core network devices in different communication systems or different core network devices in the same communication system.

Figure 7:
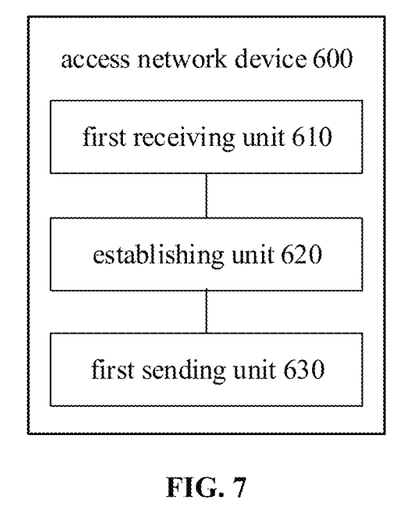
FIG. 7 shows another schematic block diagram of an access network device according to an embodiment of the present application.

FIG. 7 shows a schematic block diagram of an access network device 600 according to an embodiment of the present application. As shown in FIG. 7, the access network device may be a second access network device, and the access network device 600 includes:

a first receiving unit 610, configured to receive a tunnel setup request message sent by a first access network device, in response to switching of a terminal device from a first control plane core network device to a second control plane core network device;

an establishing unit 620, configured to establish a data tunnel according to the tunnel setup request message, wherein the data tunnel is used for data transmission between the terminal device and a user plane core network device; and a first sending unit 630, configured to send information of the data tunnel to the first access network device.

Therefore, the access network device according to the embodiment of the present application may forward data through a data tunnel established by a target access network device during a process of switching, so that reliability of data transmission may be improved as much as possible.

Optionally, in the embodiment of the present application, the data tunnel may be a tunnel between the first access network device and the second access network device, the tunnel setup request message carries an identification of the first access network device, and the information of the data tunnel includes an identification of the data tunnel and/or one or more configuration parameters of the data tunnel.

Optionally, in the embodiment of the present application, the identification of the data tunnel may be an identification of the second access network device.

Optionally, in the embodiment of the present application, the access network device further includes: a second receiving unit, configured to receive uplink data sent by the terminal device; and a second sending unit, configured to forward the uplink data to the first access network device through the data tunnel.

Optionally, in the embodiment of the present application, the access network device further includes: a third receiving unit, configured to receive downlink data sent by the user plane core network device from the first access network device through the data tunnel; and a third sending unit, configured to forward the downlink data to the terminal device.

Optionally, in the embodiment of the present application, the access network device further includes: a releasing unit, configured to release the data tunnel, after the second access network device receives a switching completion message sent by the terminal device, and/or a fourth sending unit, configured to send a path switching message to the second control plane core network device.

Optionally, in the embodiment of the present application, the data tunnel may be a tunnel between the second access network device and the user plane core network device, the tunnel setup request message carries an identification of the user plane core network device, and the information of the data tunnel includes an identification of the data tunnel and/or one or more configuration parameters of the data tunnel.

Optionally, in the embodiment of the present application, the identification of the user plane core network device and/or the identification of the data tunnel being used to send the uplink data of the terminal device to the user plane core network device.

Optionally, in the embodiment of the present application, the access network device further includes: a fifth sending unit, configured to send a path switching message to the second control plane core network device, wherein the path switching message carries the identification of the data tunnel, and the identification of the data tunnel is used to send the downlink data by the user plane core network device to the terminal device through the data tunnel.

Optionally, in the embodiment of the present application, before the terminal device completes the switching, the terminal device accesses the first control plane core network device through the first access network device; and after the terminal device completes the switching, the terminal device accesses the second control plane core network device through the second access network device.

Optionally, in the embodiment of the present application, the first control plane core network device and the second control plane core network device may be core network devices in different communication systems or different core network devices in the same communication system.

Figure 8:
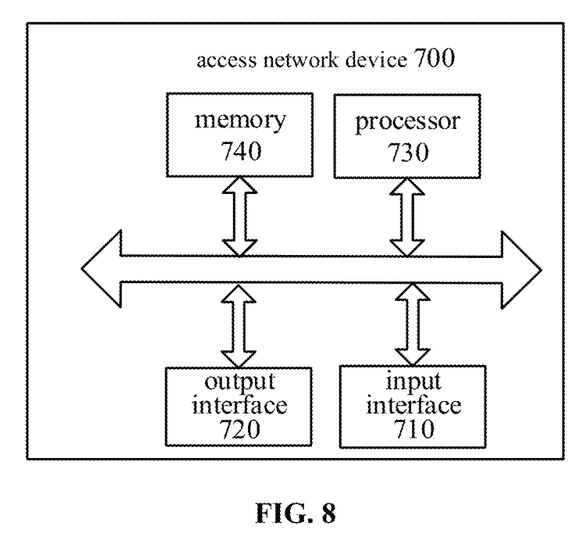
FIG. 8 shows another schematic block diagram of an access network device according to an embodiment of the present application.

As shown in FIG. 8, an access network device 700 is further provided according to an embodiment of the present application. The access network device 700 may be the access network device 300 in FIG. 6, which may be configured to perform the content of the first access network device corresponding to the method 100 of FIG. 2. The access network device 700 includes an input interface 710, an output interface 720, a processor 730, and a memory 740. The input interface 710, the output interface 720, the processor 730, and the memory 740 may be connected through a bus system. The memory 740 is configured to store programs, instructions or codes. The processor 730 is configured to execute programs, instructions, or codes in the memory 740, to control the input interface 710 to receive signals, control the output interface 720 to send signals, and implement operations in the foregoing method embodiments.

Therefore, the access network device according to the embodiment of the present application may forward data through a data tunnel established by a target access network device during a process of switching, so that reliability of data transmission may be improved as much as possible.

It should be understood that in the embodiment of the present application, the processor 730 may be a Central Processing Unit (CPU), and the processor 730 may also be other types of general-purpose processors, a digital signal processor, an application-specific integrated circuit, a field programmable gate array or other types of programmable logic devices, a discrete gate or a transistor logic device, and/or a discrete hardware component, and the like. The general-purpose processor may be a microprocessor, or the processor may be any conventional processor or the like.

The memory 740 may include a read-only memory and a random access memory, and provide instructions and data to the processor 730. A portion of the memory 740 may also include a non-volatile random access memory. For example, the memory 740 may also store device type information.

In the implementation process, the content of the above method may be implemented by hardware like an integrated logic circuit in the processor 730 or instructions in the form of software. The content of the method disclosed in conjunction with the embodiments of the present application may be directly embodied as implementation by a hardware processor, or as implementation by a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 740. The processor 730 reads information in the memory 740 and implements the content of the above method in combination with its hardware. In order to avoid repetition, these are not described in detail here.

In a specific embodiment, the receiving units in the access network device 500 may be implemented by the input interface 710 in FIG. 8, and the sending units in the access network device 500 may be implemented by the output interface 720 in FIG. 8.

Figure 9:
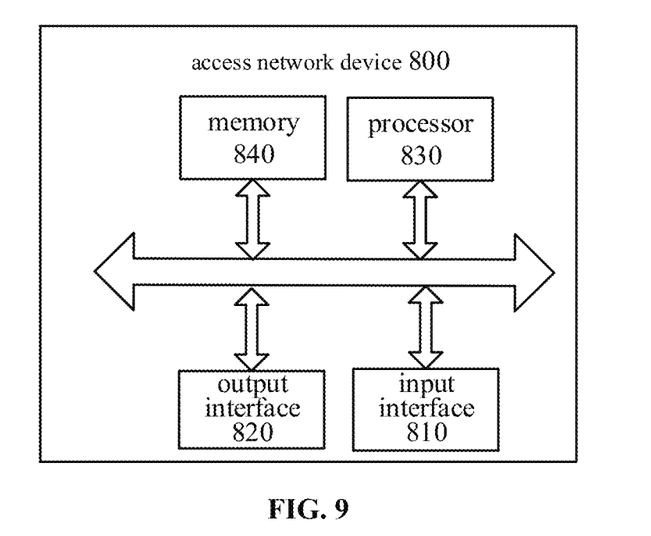
FIG. 9 shows another schematic block diagram of an access network device according to an embodiment of the present application.

As shown in FIG. 9, a core network device 800 is further provided according to an embodiment of the present application. The core network device 800 may be the core network device 600 in FIG. 7, which may be configured to execute the content of the core network device corresponding to the method 400 in FIG. 5. The core network device 800 includes an input interface 810, an output interface 820, a processor 830, and a memory 840. The input interface 810, the output interface 820, the processor 830, and the memory 840 may be connected through a bus system. The memory 840 is configured to store programs, instructions or codes. The processor 830 is configured to execute programs, instructions or codes in the memory 840, to control the input interface 810 to receive signals, control the output interface 820 to send signals, and implement operations in the foregoing method embodiments.

Therefore, the access network device according to the embodiment of the present application may forward data through a data tunnel established by a target access network device during a process of switching, so that reliability of data transmission may be improved as much as possible.

It should be understood that in the embodiment of the present application, the processor 830 may be a Central Processing Unit (CPU), and the processor 830 may also be other types of general-purpose processors, a digital signal processor, an application-specific integrated circuit, a field programmable gate array or other types of programmable logic devices, a discrete gate or a transistor logic device, a discrete hardware components, and the like. The general-purpose processor may be a microprocessor, or the processor may be any conventional processor or the like.

The memory 840 may include a read-only memory and a random access memory, and provide instructions and data to the processor 830. A portion of the memory 840 may also include a non-volatile random access memory. For example, the memory 840 may also store device type information.

In the implementation process, the content of the above method may be implemented by hardware like an integrated logic circuit in the processor 830 or instructions in the form of software. The content of the method disclosed in conjunction with the embodiments of the present application may be directly embodied as implementation by a hardware processor, or as implementation by a combination of hardware and software modules in the processor. The software module may be located in a mature storage medium in the art, such as a random access memory, a flash memory, a read-only memory, a programmable read-only memory, an electrically erasable programmable memory, and a register. The storage medium is located in the memory 840. The processor 830 reads information in the memory 840 and implements the content of the above method in combination with its hardware. In order to avoid repetition, these are not described in detail here.

In a specific embodiment, the sending units in the core network device 600 may be implemented by the output interface 820 in FIG. 9, and the receiving units in the core network device 600 may be implemented by the input interface 810 in FIG. 9. The establishing unit and the releasing unit in the core network device 600 may be implemented by the processor 830 in FIG. 9.

Those of ordinary skill in the art may realize that the units and algorithm steps of the examples described in conjunction with the embodiments disclosed herein may be implemented by electronic hardware, or a combination of computer software and electronic hardware. Whether these functions are executed in hardware or software depends on the specific application of the technical solution and design constraints. Professional technicians may use different methods to implement the described functions for each specific application, but such implementation should not be considered beyond the scope of this application.

Those skilled in the art may clearly understand that for the convenience and conciseness of the description, the specific working process of the system, device and unit described above may refer to the corresponding process in the foregoing method embodiments, which will not be repeated here.

In several embodiments of this application, it should be understood that the disclosed system, device, and method may be implemented in other ways. For example, the device embodiments described above are only schematic. For example, the division of the units is only a logical function division. In actual implementation, there may be another division manner, for example, multiple units or components may be combined or may integrated into another system, or some features may be ignored, or not implemented. In addition, the displayed or discussed mutual coupling or direct coupling or communication connection may be indirect coupling or communication connection through some interfaces, devices or units, and may be in electrical, mechanical or other forms.

The units described as separate components may or may not be physically separated, and a component displayed as a unit may or may not be a physical unit, that is, it may be located in one place, or may be distributed across multiple network units. Some or all of the units may be selected according to actual needs, to achieve the purposes of the solutions of the embodiments.

In addition, functional units in each embodiment of the present application may be integrated into one processing unit, or each unit may exist alone physically, or two or more units are integrated into one unit.

If a function is implemented in the form of a software functional unit and sold or used as an independent product, it may be stored in a computer-readable storage medium. Based on such an understanding, the technical solution of the present application essentially or part of the contribution to the existing technology or part of the technical solution may be embodied in the form of a software product, and the computer software product is stored in a storage medium, including several instructions configured to cause a computer device (which may be a personal computer, a server, and/or a network device, etc.) to perform all or some of the steps of the embodiments of the present application. The foregoing storage media include all kinds of media that may store program codes, such as a U disk, a mobile hard disk, a Read-Only Memory (ROM), a Random Access Memory (RAM), a magnetic disk or an optical disk.

The above is only the specific implementation of this application, but the protection scope of this application is not limited to this. Any person skilled in the art may easily think of changes or replacements within the technical scope disclosed in this application, which should be within the scope of protection of this application. Therefore, the protection scope of the present application shall be subject to the protection scope of the claims.

What is claimed is:

1. A switching method, comprising:
    sending, by a first access network device, a tunnel setup request message to a second access network device, in response to switching of a terminal device from a first control plane core network device to a second control plane core network device;
    receiving, by the first access network device, information of a data tunnel established by the second access network device according to the tunnel setup request message; and
    sending, by the first access network device, the information of the data tunnel to the terminal device, wherein the information of the data tunnel is used for data transmission between the terminal device and a user plane core network device;
    wherein the data tunnel comprises a tunnel between the first access network device and the second access network device, the tunnel setup request message carries an identification of the first access network device, and the information of the data tunnel comprises:
    an identification of the data tunnel,
    one or more configuration parameters of the data tunnel, or
    the identification of the data tunnel and the one or more configuration parameters of the data tunnel;
    wherein the method further comprises:
    receiving, by the first access network device, uplink data sent by the terminal device, from the second access network device through the data tunnel; and
    sending, by the first access network device, the uplink data to the user plane core network device.

2. The method of claim 1, wherein the identification of the data tunnel comprises an identification of the second access network device.

3. The method of claim 1, further comprising:
receiving, by the first access network device, downlink data sent by the user plane core network device; and
sending, by the first access network device, the downlink data to the second access network device through the data tunnel, wherein the downlink data is sent by the second access network device to the terminal device.

4. An access network device, which is a first access network device, the access network device comprising a transceiver, wherein the transceiver is configured to:
send a tunnel setup request message to a second access network device, in response to switching of a terminal device from a first control plane core network device to a second control plane core network device;
receive information of a data tunnel established by the second access network device according to the tunnel setup request message; and
send the information of the data tunnel to the terminal device, wherein the information of the data tunnel is used for data transmission between the terminal device and a user plane core network device;
wherein the data tunnel is a tunnel between the second access network device and the user plane core network device, the tunnel setup request message carries an identification of the user plane core network device, and the information of the data tunnel comprises:
an identification of the data tunnel,
one or more configuration parameters of the data tunnel, or
the identification of the data tunnel and the one or more configuration parameters of the data tunnel;
wherein the identification of the user plane core network device, or the identification of the data tunnel, or the identification of the user plane core network device and the identification of the data tunnel being used to send uplink data of the terminal device to the user plane core network device.

5. The access network device of claim 4, wherein before the terminal device completes the switching, the terminal device accesses the first control plane core network device through the first access network device; and after the terminal device completes the switching, the terminal device accesses the second control plane core network device through the second access network device.

6. The access network device of claim 4, wherein the first control plane core network device and the second control plane core network device are core network devices in different communication systems or different core network devices in a same communication system.

7. An access network device, which is a second access network device, the access network device comprising a transceiver and a processor, wherein:
the transceiver is configured to receive a tunnel setup request message sent by a first access network device, in response to switching of a terminal device from a first control plane core network device to a second control plane core network device;
the processor is configured to establish a data tunnel according to the tunnel setup request message, wherein the data tunnel is used for data transmission between the terminal device and a user plane core network device; and
the transceiver is further configured to send information of the data tunnel to the first access network device;
wherein the data tunnel is a tunnel between the first access network device and the second access network device, the tunnel setup request message carries an identification of the first access network device, and the information of the data tunnel comprises:
an identification of the data tunnel,
one or more configuration parameters of the data tunnel, or
the identification of the data tunnel and the one or more configuration parameters of the data tunnel;
wherein:
the transceiver is further configured to receive uplink data sent by the terminal device; and
the transceiver is further configured to forward the uplink data to the first access network device through the data tunnel.

8. The access network device of claim 7, wherein the identification of the data tunnel is an identification of the second access network device.

9. The access network device of claim 7, wherein:
the processor is further configured to release the data tunnel, after the second access network device receives a switching completion message sent by the terminal device, or
the transceiver is further configured to send a path switching message to the second control plane core network device, or
the processor is further configured to release the data tunnel, after the second access network device receives a switching completion message sent by the terminal device, and the transceiver is further configured to send a path switching message to the second control plane core network device.

10. The access network device of claim 7, wherein the data tunnel comprises a tunnel between the second access network device and the user plane core network device, and the tunnel setup request message carries an identification of the user plane core network device.

11. The access network device of claim 10, wherein the transceiver is further configured to send a path switching message to the second control plane core network device, wherein the path switching message carries the identification of the data tunnel, and the identification of the data tunnel is used to send downlink data by the user plane core network device to the terminal device through the data tunnel.

12. The access network device of claim 10, wherein:
the transceiver is further configured to receive uplink data sent by the terminal device; and
the transceiver is further configured to send the uplink data to the user plane core network device through the data tunnel.

13. The access network device of claim 10, wherein:
the transceiver is further configured to receive downlink data sent by the user plane core network device through the data tunnel; and
the transceiver is further configured to send the downlink data to the terminal device.

14. The access network device of claim 10, wherein:
an identification of the data tunnel, or one or more configuration parameters of the data tunnel, or the identification of the data tunnel and the one or more configuration parameters of the data tunnel being assigned by the second access network device.

* * * * *